United States Patent
Wu

(10) Patent No.: US 8,931,366 B2
(45) Date of Patent: Jan. 13, 2015

(54) LOCKABLE BRAKING DEVICE

(76) Inventor: Ching-Tsang Wu, Xinbei (TW)

( * ) Notice: Subject to any disclaimer, the term of this patent is extended or adjusted under 35 U.S.C. 154(b) by 238 days.

(21) Appl. No.: 13/406,074

(22) Filed: Feb. 27, 2012

(65) Prior Publication Data

US 2013/0199329 A1 Aug. 8, 2013

(30) Foreign Application Priority Data

Feb. 8, 2012 (TW) ............... 101202242 A

(51) Int. Cl.
*B60T 7/10* (2006.01)
*F16C 1/10* (2006.01)
*B60T 1/04* (2006.01)

(52) U.S. Cl.
CPC .. *B60T 1/04* (2013.01); *B60T 7/102* (2013.01)
USPC ....... 74/502.2; 74/489; 188/24.18; 188/24.22

(58) Field of Classification Search
CPC ............ B60T 1/04; B60T 7/102; B62K 23/02
USPC ................. 74/502.2; 188/19, 20, 24.18, 24.22
See application file for complete search history.

(56) References Cited

U.S. PATENT DOCUMENTS

| | | | | |
|---|---|---|---|---|
| 5,896,779 A * | 4/1999 | Biersteker et al. ........... | 74/502.2 |
| 5,927,441 A * | 7/1999 | Luo ................................. | 188/19 |
| 6,079,290 A * | 6/2000 | Li ................. | 74/502.2 |
| 6,192,772 B1 * | 2/2001 | Huang ......................... | 74/502.2 |
| 6,216,825 B1 * | 4/2001 | Hung ......................... | 188/24.22 |
| 6,247,379 B1 * | 6/2001 | Chen .......................... | 74/502.2 |
| 6,647,825 B1 * | 11/2003 | Lin .............................. | 74/502.2 |
| 8,596,657 B1 * | 12/2013 | Liu ............................. | 280/79.11 |
| 2004/0020322 A1 * | 2/2004 | Hsieh ........................... | 74/502.2 |
| 2008/0047785 A1 * | 2/2008 | Huang ....................... | 188/24.18 |

* cited by examiner

Primary Examiner — Vinh Luong
(74) *Attorney, Agent, or Firm* — Rosenberg, Klein & Lee

(57) ABSTRACT

A lockable braking device comprises a controlling set having a cover fixed to a frame, a braking grip pivoted to the cover and partially protruded out of the cover, a connecting member pivoted to the cover and one end thereof being propelled by the braking grip, and a crank pivoted to the cover and being motivated by the braking grip. Whereby, the braking grip adjustably controls a braking state of a braking unit to attain a common stopping performance and a constant stopping effect. Accordingly, the structure of the braking device is simplified and the operation thereof is more easy and handy.

1 Claim, 5 Drawing Sheets

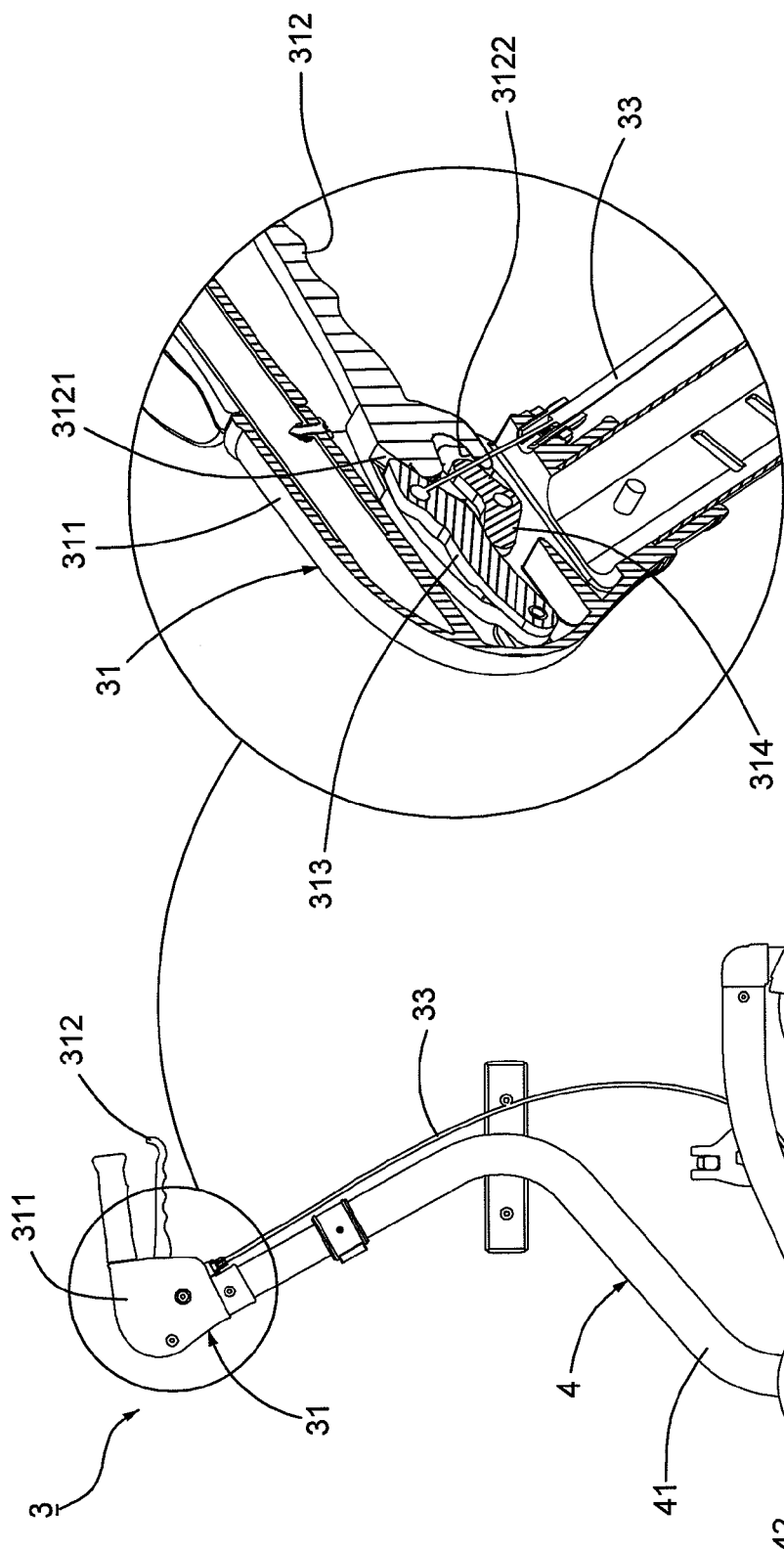

LOCKABLE BRAKING DEVICE

FIELD OF THE INVENTION

The present invention relates to a braking device, particularly to a lockable braking device.

DESCRIPTION OF THE RELATED ART

Referring to FIG. 1, a conventional walking aid 1 comprises a frame 11, and a wheel set 12 disposed at a bottom of the frame 11. In order to stop the rolling of the wheel set 12, a braking device 2 is installed on the frame 11. The braking device 2 has a braking grip 21 disposed on the frame 11, a braking unit 22 disposed near the wheel set 12 for controlling the rolling of the wheel set 12, and a braking wire 23 connecting the braking grip 21 with the braking unit 22. In operation, the braking grip 21 is pulled for causing the braking wire 23 to control the braking unit 22, so that the rolling state of the wheel set 12 would be timely influenced. Accordingly, the moving speed of the walking aid 1 lessens or the moving walking aid 1 stops.

However, in practice, the braking device 2 does not allow the braking unit 22 to stop the walking aid 1 unless users hold the braking grip 21. Namely, if users release the braking grip 21, the braking unit 22 does not provide a braking effect. As a result, the braking device 2 can not be locked for steadily holding the braking state of the walking aid 1.

SUMMARY OF THE INVENTION

It is therefore the purpose of this invention to provide a lockable braking device that simplifies the structure of the braking device, thereby allowing users to achieve an easy and convenient operation.

The lockable braking device in accordance with the present invention is installed on a walking aid. The walking aid comprises a frame, and a wheel set disposed on the frame for the braking device to control a rolling state of the wheel set. The braking device comprises a controlling set disposed on the frame, a braking unit for controlling the rolling state of the wheel set, and a connecting wire for connecting the controlling set with the braking unit. Wherein, the controlling set has a cover fixed to the frame, a braking grip pivoted to the cover and partially protruded out of the cover, a connecting member and a crank respectively disposed in relation to the braking grip, so that the connecting member is pivoted to the cover with one end thereof driven by the braking grip, and the crank is pivoted to the cover and capable of being driven by the braking grip for activating the connecting member. The connecting member is connected to the connecting wire. The braking grip has an upper part for pushing the connecting member and a lower part oppositely disposed to the upper part for pushing the crank.

Preferably, a connecting seat is disposed between the connecting wire and the connecting member, and a recovering member is disposed between the cover and the connecting seat.

Accordingly, the braking grip could be freely pulled upward or pushed downward for controlling the braking state of the braking device or for locking the braking device properly, respectively. Advantageously, the braking device of the present invention has a simplified structure, and the operation thereof is more easy and convenient.

BRIEF DESCRIPTION OF THE DRAWINGS

FIG. 2 is a schematic view showing a first preferred embodiment of the present invention;

FIG. 3 is a partially enlarged view of FIG. 2;

DETAILED DESCRIPTION OF THE PREFERRED EMBODIMENTS

Figure 1:
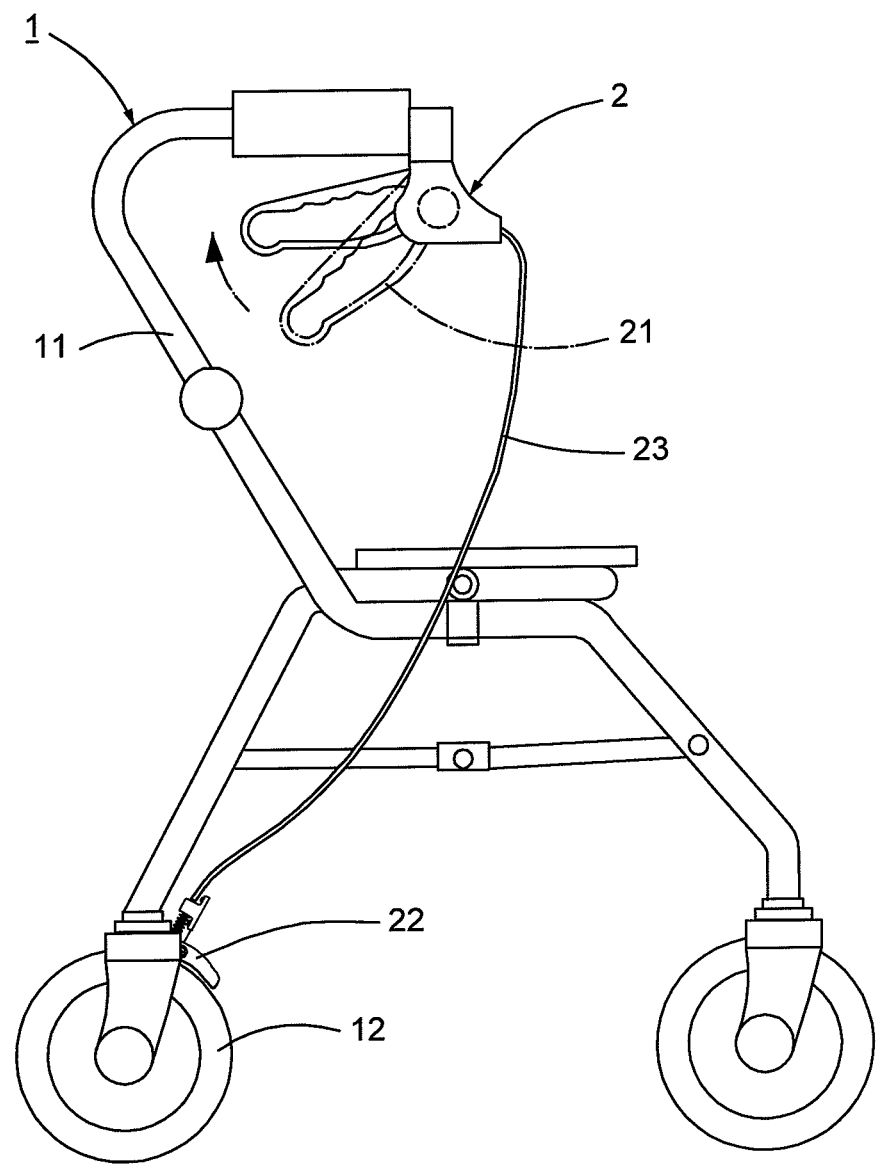
FIG. 1 is a schematic view showing a conventional walking aid.
Figure 5:
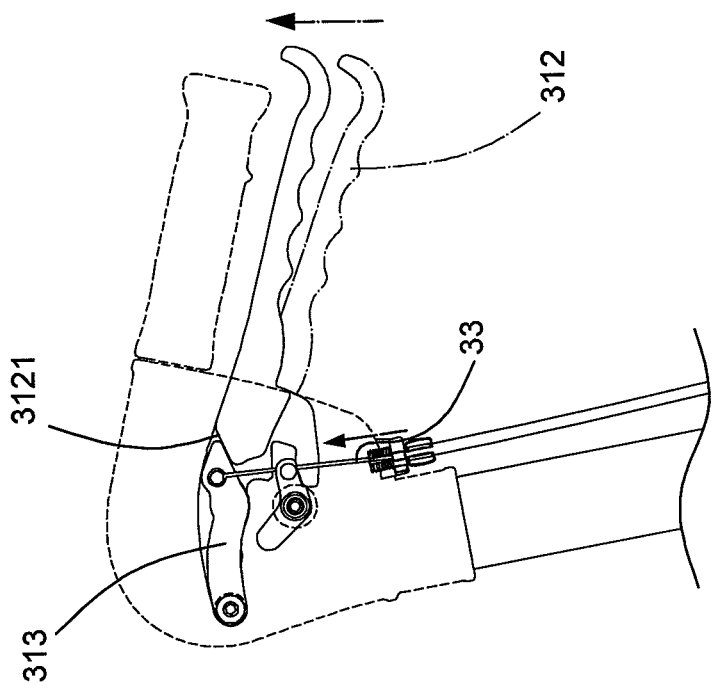
FIGS. 4 to 7 are schematic views showing the first preferred embodiment in operation.

Wherever possible, the same reference numbers are used in the drawings and the description to refer to the same or like parts.

Referring to FIGS. 2 and 3, a first preferred embodiment of the present invention is shown. A lockable braking device 3 is installed on a walking aid 4. The walking aid 4 comprises a frame 41, and a wheel set 42 disposed on the frame 41. The braking device 3 comprises a controlling set 31, a braking unit 32 for controlling a rolling state of the wheel set 42, and a connecting wire 33 for connecting the controlling set 31 with the braking unit 32. Accompanying with FIG. 4, the controlling set 31 has a cover 311 fixed to the frame 41, a braking grip 312 pivoted to the cover 311 and partially protruded out of the cover 311, a connecting member 313 and a crank 314 respectively disposed in relation to the braking grip 312, so that the connecting member 313 is pivoted to the cover 311 with one end thereof driven by the braking grip 312, and the crank 314 is pivoted to the cover 311 and capable of being driven by the braking grip 312 for activating the connecting member 313. The connecting member 313 is connected to the connecting wire 33. The braking grip 312 has an upper part 3121 for pushing the connecting member 313 and a lower part 3122 oppositely disposed to the upper part 3121 for pushing the crank 314. In this embodiment, the connecting wire 33 adopts a braking wire.

Figure 4:
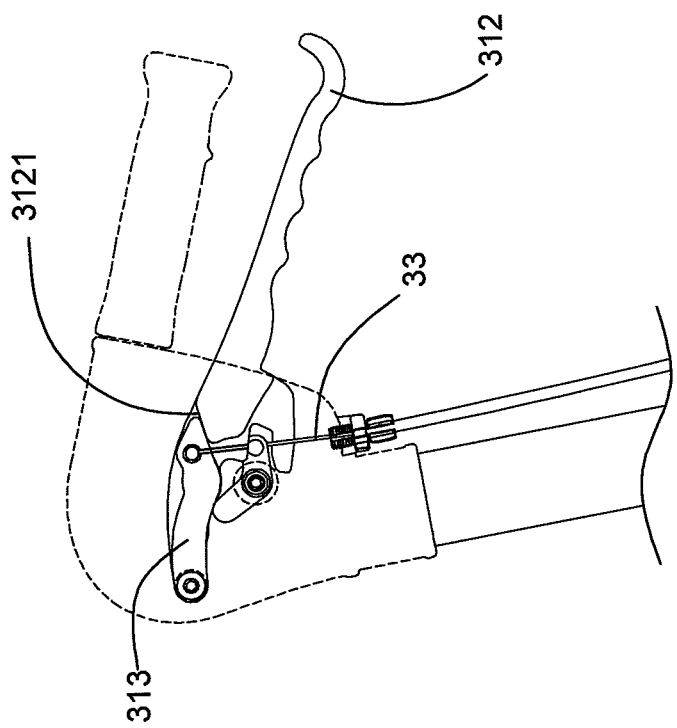
Figure 6:
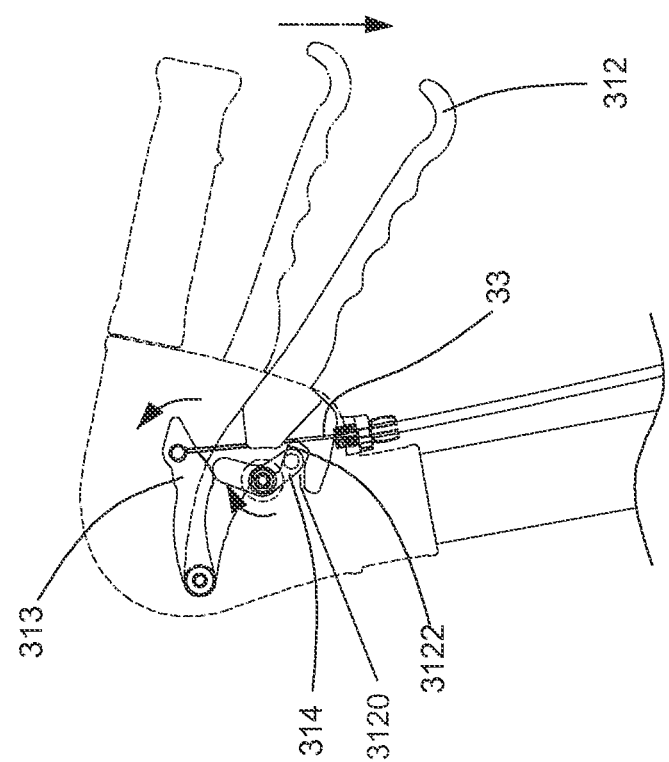

Referring to FIGS. 2 to 5, in order to brake the walking aid 4, users have to hold and pull the braking grip 312 upward for the upper part 3121 to prop the connecting member 313, so that the connecting member 313 causes the connecting wire 33 (as arrowed in FIG. 5) to pull the braking unit 32. Whereby, the braking unit 32 stops the rolling of the wheel set 42. Particularly, if the braking grip 312 is released, the connecting member 313 props the upper part 3121 of the braking grip 312, so that the braking grip 312 is retrieved to the state that the walking aid 4 is not stopped (as shown in FIG. 4). Further referring to FIG. 6, when the wheel set 42 is to be locked for braking, the braking grip 312 is pushed downward for the lower part 3122 to propel one end of the crank 314. Accordingly, the other end of the crank 314 propels the connecting member 313 so as to lift the connecting wire 33. In the meantime, the crank 314 and the connecting member 313 are engaged fixedly. Therefore, even if the braking grip 312 is not clutched, the braking grip 312 and the braking unit 32 will not return to the state that the walking aid 4 is not stopped. Namely, the wheel set 42 does not move in view of the locked-up breaking device 3.

Figure 7:
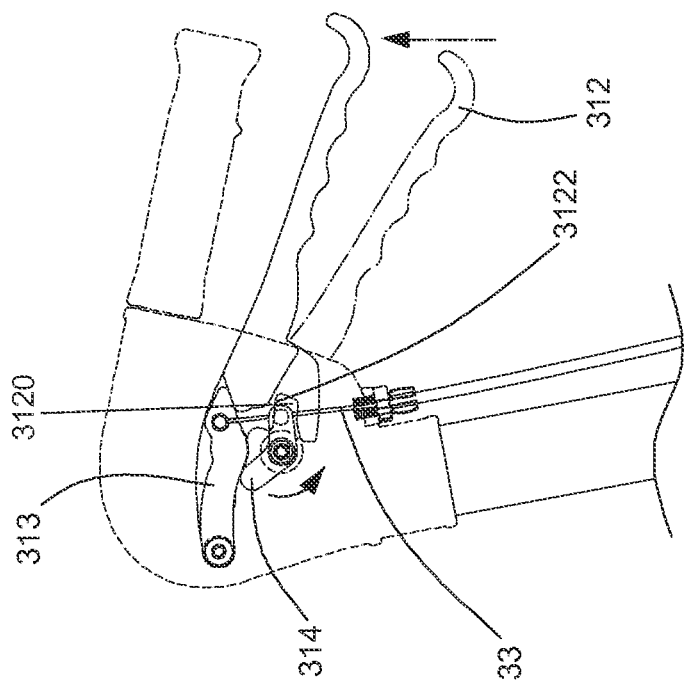

Referring to FIG. 7, in order to unlock the braking unit 32, the braking grip 312 should be lifted for the lower part 3122 to rotate the crank 314. Accordingly, the crank 314 thence departs from the connecting member or connector 313, so that the connecting member 313, the connecting wire 33, the braking grip 312, and the braking unit 22 all retrieve to the state that the walking aid 4 is not stopped. Obviously, by means of the controlling set 31, the braking grip 312 decides the braking state of the braking unit 32. Namely, the braking unit 32 could timely function in a common riding, or the braking unit 32 could favorably function for a constant braking. Thus, the simplified structure of the braking device however provides the multiple performances and concurrently contributes to a convenient and easy operation. As is shown in FIGS. 3-7, the braking grip 312 includes a recess 3120 for capturing an end of the crank whereby displacement of the braking grip 312 drives the end of the crank 314 in a rotational direction.

Figure 9:
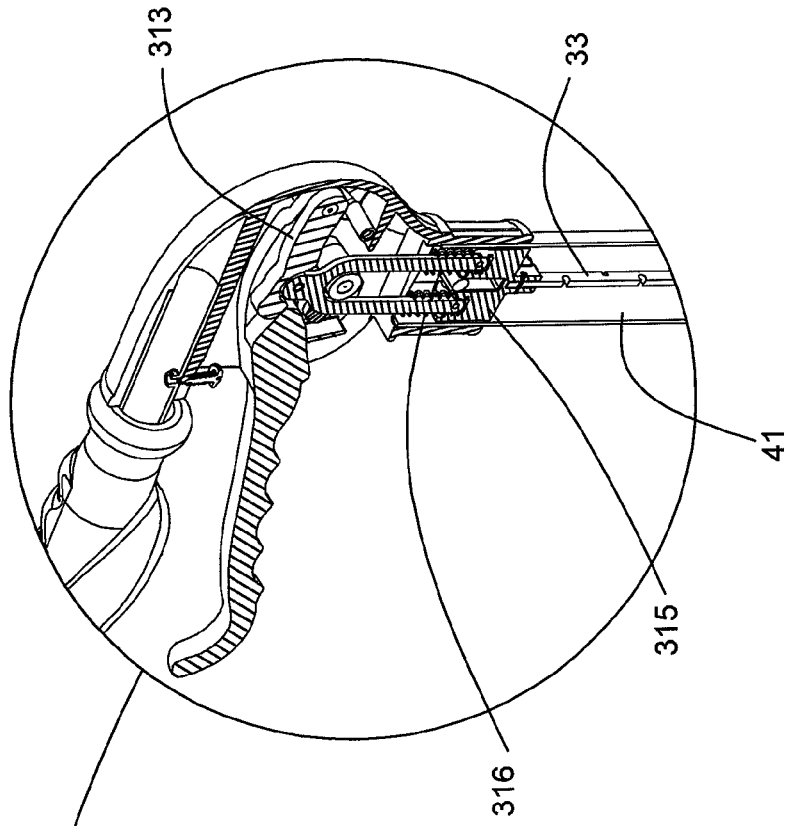
FIG. 9 is a partially enlarged view of FIG. 8.
Figure 8:
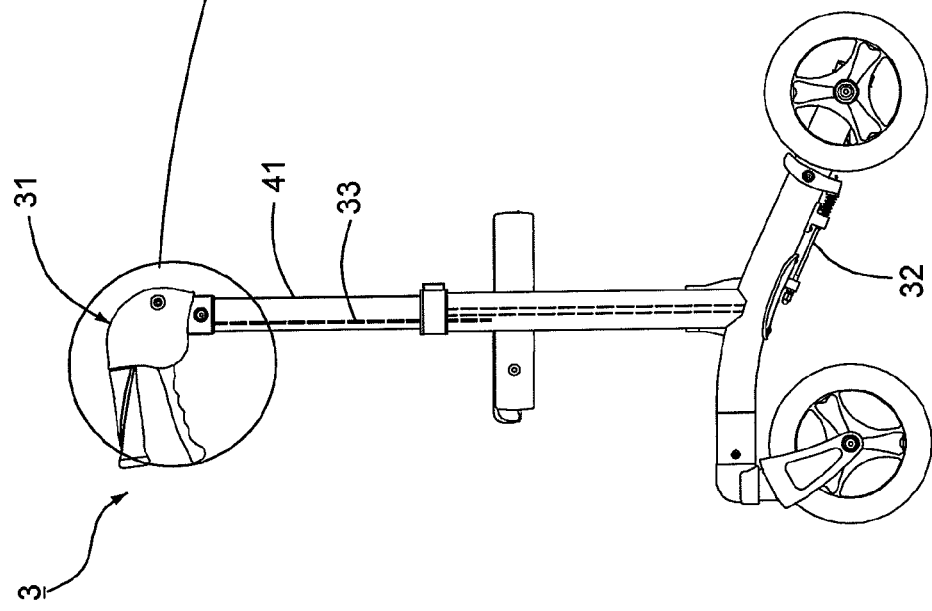
FIG. 8 is a schematic view showing a second preferred embodiment of the present invention.

FIGS. 8 and 9 show a second preferred embodiment of the present invention that provides a similar lockable braking device 3 as mentioned before. The braking device 3 still comprises a controlling set 31, a braking unit 32, and a connecting wire 33; the same correlation and the like functions within elements as those in the first preferred embodiment are herein omitted. Differently, the connecting wire 33 in this embodiment is disposed inside the frame 41. Moreover, a connecting seat 315 is disposed between the connecting wire 33 and the connecting member 313; a recovering member 316 is disposed between the cover 311 and the connecting seat 315. By means of the connecting seat 315, the connecting member 33 would be fixed to the connecting seat 315 when the connecting wire 33 is disposed inside the frame 41. Accordingly, the connecting seat 315 causes the connecting member 313 to move. Moreover, the recovering member 316 allows the connecting seat 315 to precisely move back to the original position after the connecting seat 315 is influenced by the connecting member 313. While the controlling set 315 and the connecting wire 33 are mostly hidden in the frame 41, the appearance of the frame 41 would be more concise and compact.

To sum up, the present invention in particularly utilizes the braking grip in the controlling set to cause the braking unit to stop the walking aid with a common state or with a locking state. Apparently, the structure of the braking device is simplified and the operation thereof is more easy and handy.

While we have shown and described the embodiment in accordance with the present invention, it should be clear to those skilled in the art that further embodiments may be made without departing from the scope of the present invention.

I claim:

1. A lockable braking device installed on a walking aid; said walking aid comprising a frame and a wheel set disposed on said frame for said braking device to control a rolling state of said wheel set; said braking device comprising:

a controlling set disposed on said frame, a braking unit for controlling said rolling state of said wheel set, and a connecting wire for connecting said controlling set with said braking unit;

wherein said controlling set has a cover fixed to said frame, a braking grip pivoted to said cover and partially protruded out of said cover, a connector and a crank respectively disposed in relation to said braking grip, so that said connector is pivoted to said cover with one end thereof driven by said braking grip, and said crank is pivoted to said cover and capable of being driven by said braking grip for activating said connector;

said one end of said connector being connected to said connecting wire; said braking grip having an upper part for pushing said one end of said connector and a lower part oppositely disposed to said upper part for pushing a first end of said crank, whereby said first end of said crank pushed by said braking grip is turned to a direction to allow the second end of said crank to activate said connector for brake-locking, said braking grip having a recess for capturing said first end of said crank whereby displacement of said braking grip drives said first end of said crank in a rotational direction and responsively displaces said second end of said crank into (1) a totally unlocked position wherein said second end of said crank abuts a first portion of said connector, (2) a releasably-locked position wherein said second end of said crank is displaced from said connector and, (3) a totally locked position wherein said second end of said crank abuts a second portion of said connector and wherein a connecting seat is disposed between said connecting wire and said connector, and a recovering portion is disposed between said cover and said connecting seat.

* * * * *